(12) United States Patent
Lee

(10) Patent No.: US 12,304,311 B2
(45) Date of Patent: May 20, 2025

(54) DISPLAY ASSEMBLY FOR VEHICLE

(71) Applicant: HYUNDAI MOBIS CO., LTD., Seoul (KR)

(72) Inventor: Joung Hoon Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 122 days.

(21) Appl. No.: 17/827,037

(22) Filed: May 27, 2022

(65) Prior Publication Data

US 2023/0074923 A1  Mar. 9, 2023

(30) Foreign Application Priority Data

Sep. 6, 2021  (KR) .......................... 10-2021-0118668

(51) Int. Cl.
*B60K 35/60* (2024.01)
*B60K 35/22* (2024.01)
*G02F 1/1333* (2006.01)

(52) U.S. Cl.
CPC ........ *B60K 35/60* (2024.01); *G02F 1/133314* (2021.01); *G02F 1/133322* (2021.01); *G02F 1/133331* (2021.01); *B60K 35/22* (2024.01); *B60K 2360/1523* (2024.01); *B60K 2360/652* (2024.01); *G02F 2202/28* (2013.01)

(58) Field of Classification Search
CPC .......... G02F 1/133308–133331; B60K 37/00; B60K 37/02; B60K 35/00; B60K 2370/152–1523; B60K 35/22
See application file for complete search history.

(56) References Cited

U.S. PATENT DOCUMENTS

2019/0299864 A1\* 10/2019 Kitajima ................. B60R 11/04
2020/0233259 A1\* 7/2020 Yamazaki .............. B60K 35/00

FOREIGN PATENT DOCUMENTS

| CN | 104181716 A | \* | 12/2014 | ............... G02F 1/13 |
| KR | 2020-0098177 A | | 8/2020 | |
| WO | WO-2020213251 A1 | \* | 10/2020 | |

\* cited by examiner

*Primary Examiner* — Mariceli Santiago
(74) *Attorney, Agent, or Firm* — NovoTechIP International PLLC

(57) ABSTRACT

A display assembly for a vehicle may include: a back cover constituting the body of the display assembly, and fixed to an instrument panel; an LCD module disposed at the front of the back cover; and a coupling member disposed between the back cover and the LCD module, and configured to couple the back cover and the LCD module to each other. The coupling member may be formed of a double-sided tape.

6 Claims, 4 Drawing Sheets

200: 210, 220, 230, 240, 250

200: 210, 220, 230, 240, 250

200: 210, 220, 230, 240, 250, 260

DISPLAY ASSEMBLY FOR VEHICLE

CROSS-REFERENCE TO RELATED APPLICATIONS

This application claims benefit of priority to Korean Patent Application No. 10-2021-0118668, filed on Sep. 6, 2021, the disclosure of which is incorporated herein by reference in its entirety.

BACKGROUND

1. Technical Field

The present disclosure relates to a display assembly, and more particularly, to a display assembly for a vehicle.

2. Discussion of Related Art

A display assembly for a vehicle refers to an audiovisual system for a vehicle equipped with an imaging system, such as TV and video, as well as a car audio system inside the vehicle.

Such a display assembly for a vehicle is mounted on an instrument panel installed beside a driver seat, in order to provide convenience to passengers in the vehicle. Recently, the development of autonomous driving performance and automotive technology has improved the quantity and quality of the display assembly.

In particular, the display assembly for a vehicle has been gradually increased in size and resolution, and diversified in various manners. According to a typical market flow, such a tendency will be accelerated more and more.

Such a display assembly is roughly composed of an LCD module and a frame for supporting the LCD module. The frame will be hereinafter referred to as a bezel area.

The LCD module is an area to which a screen is actually outputted, and the bezel area serves to block unnecessary light leakage from the edge of the LCD module.

As the bezel area has a smaller width, a user can further concentrate on the screen outputted from the LCD module. In particular, although the user sees an image on a smart phone, the screen looks full on the smart phone with a small bezel area, and thus increases the immersion level of the user.

For this reason, a display device whose bezel area is hardly recognized by a user has been developed.

However, when a driver or passenger collides with the display assembly in case of an accident of the vehicle, the front edge of the bezel area needs to have a curvature radius of about 2.5 mm, in order to obey the rules related to the head impact interior fitting for minimizing an injury from the display assembly.

Therefore, the related art had problems in that the rules related to the head impact interior fitting cannot be satisfied at the same time with the removal of the bezel area.

For the above-described reasons, manufactures in the corresponding field are seeking for a method capable of removing the bezel area and satisfying the rules related to the head impact interior fitting. Up to now, however, the manufacturers do not acquire satisfactory results.

SUMMARY

Various embodiments are directed to a display assembly for a vehicle, which can satisfy the rules related to the head impact interior fitting while a bezel area is removed.

The above-described object and other objects, the advantages and characteristics of the present disclosure and a method for achieving the objects, the advantages and characteristics will be clearly understood through embodiments to be described below in detail with reference to the accompanying drawings.

In an embodiment, a display assembly for a vehicle may include: a back cover constituting the body of the display assembly, and fixed to an instrument panel; an LCD module disposed at the front of the back cover; and a coupling member disposed between the back cover and the LCD module, and configured to couple the back cover and the LCD module to each other. The coupling member may be formed of a double-sided tape.

The back cover may include: a body part constituting the body of the back cover; and an extension part formed along the edge of the body part and extended toward the LCD module.

The LCD module may include: a cover member housed in the back cover, such that an outer edge surface thereof is spaced apart by a predetermined distance from an inner edge surface of the back cover; a display unit housed in the cover member, and configured to receive an output signal from the outside and output various pieces of information; a cover glass disposed at the front of the cover member; and a bonding member disposed between the cover member and the cover glass, and configured to bond the cover member and the cover glass to each other.

The cover glass may have a round portion formed along the edge thereof on an interior side of the vehicle, the round portion having a curvature radius of about 2.5 mm.

The bonding member may have an area smaller than or equal to the area of the display unit.

The bonding member may be made of an OCA (Optically Clear Adhesive).

The back cover may have an edge length smaller than or equal to that of the cover glass.

The coupling member may be disposed between the extension part and the cover glass.

The coupling member may be formed in a belt shape along the extension part.

In another embodiment, a display assembly for a vehicle may include: a back cover constituting the body of the display assembly, and fixed to an instrument panel; an LCD module disposed at the front of the back cover; and a coupling member disposed between the back cover and the LCD module, and configured to couple the back cover and the LCD module to each other. The back cover may include: a body part constituting the body of the back cover; an extension part formed along the edge of the body part and extended toward the LCD module; and a tension member formed on a surface of the body part, facing the LCD module, and located at a position spaced apart by a predetermined distance from the extension part.

The tension member may prevent the LCD module from being excessively pushed toward the body part.

In still another embodiment, a display assembly for a vehicle may include: a back cover constituting the body of the display assembly, and fixed to an instrument panel; an LCD module disposed at the front of the back cover; and a coupling member disposed between the back cover and the LCD module, and configured to couple the back cover and the LCD module to each other. The LCD module may include: a cover member housed in the back cover, such that an outer edge surface thereof is spaced apart by a predetermined distance from an inner edge surface of the back cover; a cover glass disposed at the front of the cover member; a bonding member disposed between the cover member and the cover glass, and configured to bond the cover member and the cover glass to each other; and a film member attached to a surface of the cover glass, facing the interior of the vehicle.

The film member may be formed of an ASF (Anti-Shatter Film).

In accordance with the present disclosure, the edge region of the back cover may not protrude from the edge of the cover glass, but may be covered by the cover glass. Therefore, the edge region of the LCD module may be removed so that the LCD module has a bezel-less shape, which makes it possible to improve the interior quality of the instrument panel on which the display assembly for a vehicle is mounted.

Furthermore, the round portion having a curvature radius of about 2.5 mm may be formed along the edge of the cover glass on the interior side of the vehicle, and thus the cover glass can satisfy the rules related to the head impact interior fitting.

Furthermore, the tension member may be extended in a stair shape toward the LCD module, thereby effectively preventing the LCD module from being excessively pushed toward the body part.

Furthermore, when the LCD module is coupled to the back cover, the tension member may be spaced apart by a predetermined distance from the LCD module. Thus, the tension member may prevent the LCD module from being separated from the back cover by a force of pushing the LCD module toward the interior of the vehicle.

DETAILED DESCRIPTION

Figure 1:
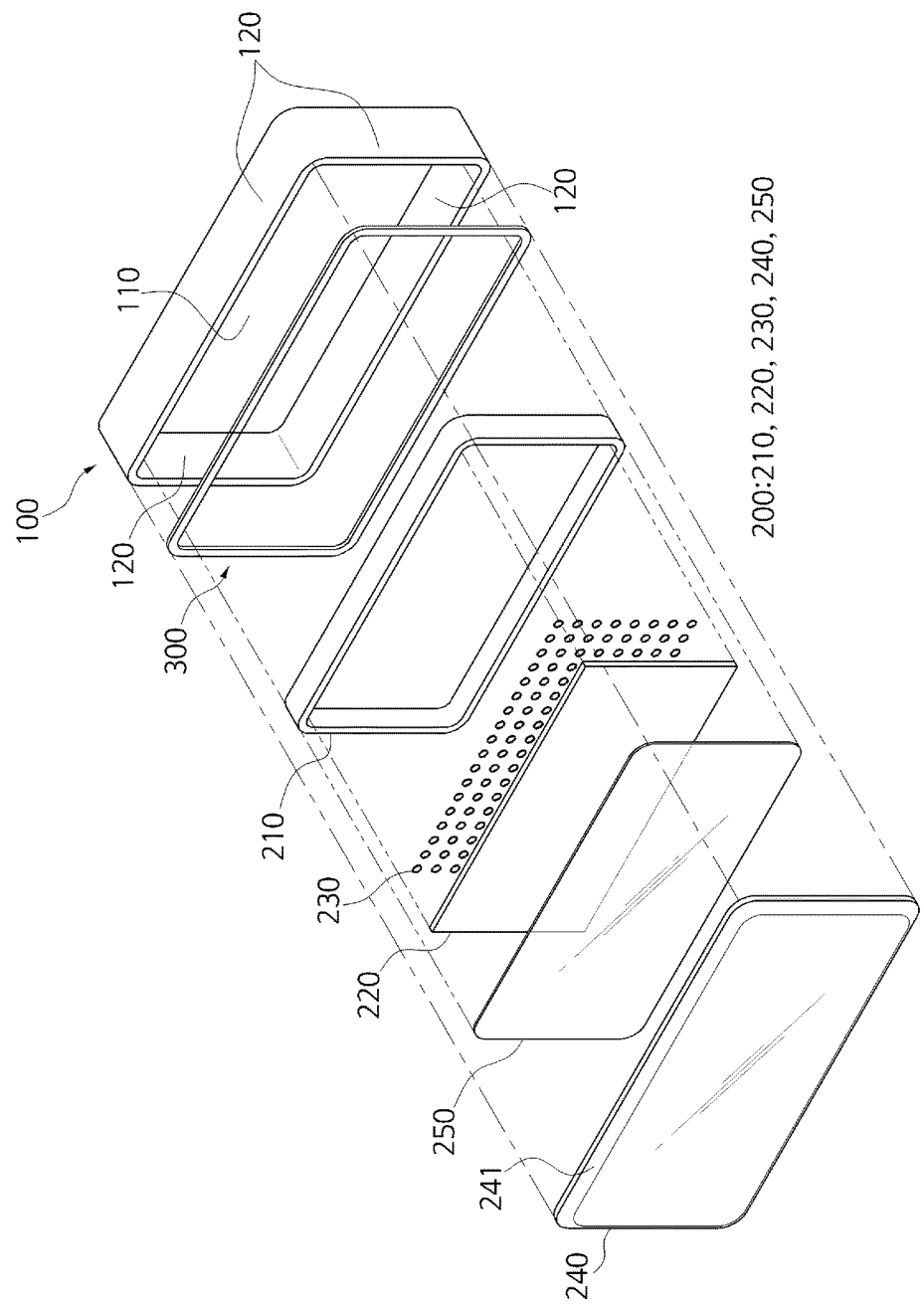
FIG. 1 is an exploded perspective view illustrating a display assembly for a vehicle in accordance with an embodiment of the present disclosure.

Embodiments of the present disclosure are provided to more completely describe the present disclosure to those skilled in the art. The following embodiments may be modified into various other forms, and the scope of the present disclosure is not limited to the following embodiments. Rather, the embodiments are provided to more reliably and completely describe the present disclosure, and to completely transfer the spirit of the present disclosure to those skilled in the art. In the drawings, components are exaggerated for convenience and clarity of description, and like reference numerals represent the same elements. In this specification, the term "and/or" includes any one of corresponding listed items and one or more combinations thereof.

The terms used in this specification are used to describe a specific embodiment, and do not limit the present disclosure.

In this specification, the terms of a singular form may include plural forms unless referred to the contrary in the context. Furthermore, in this specification, the terms "comprise" and/or "comprising" specifies the presence of a shape, number, step, operation, member, element, and/or a group thereof, and do not exclude the presence or addition of one or more other shapes, numbers, steps, operations, members, elements, and groups thereof.

Hereafter, preferred embodiments of the present disclosure will be described in detail with reference to the accompanying drawings.

Figure 2:
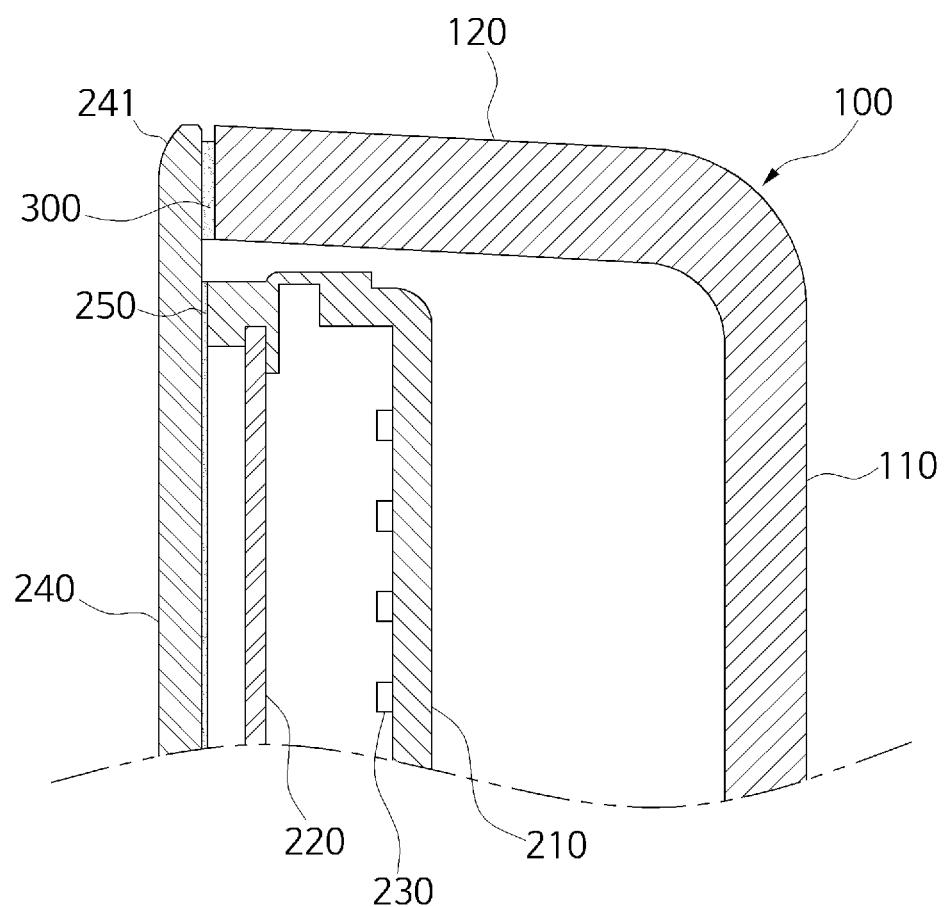
FIG. 2 is a cross-sectional view illustrating the display assembly for a vehicle in accordance with the embodiment of the present disclosure.
Figure 3:
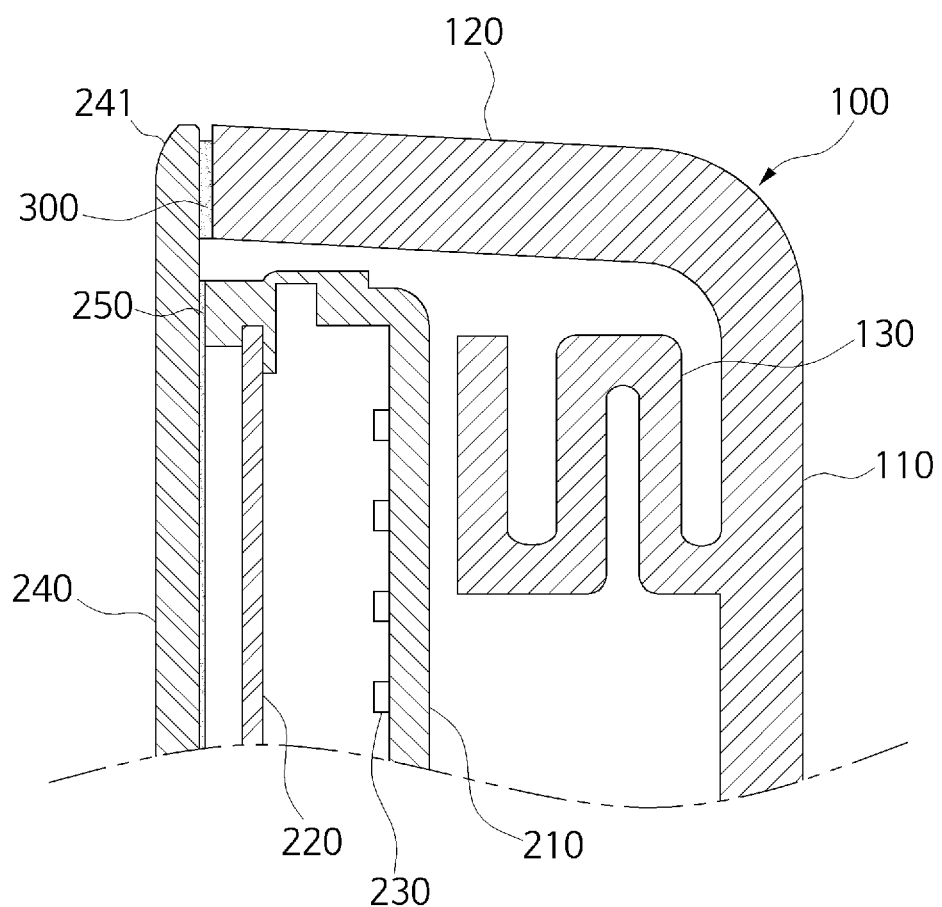
FIG. 3 is a cross-sectional view illustrating a display assembly for a vehicle in accordance with another embodiment of the present disclosure.
Figure 4:
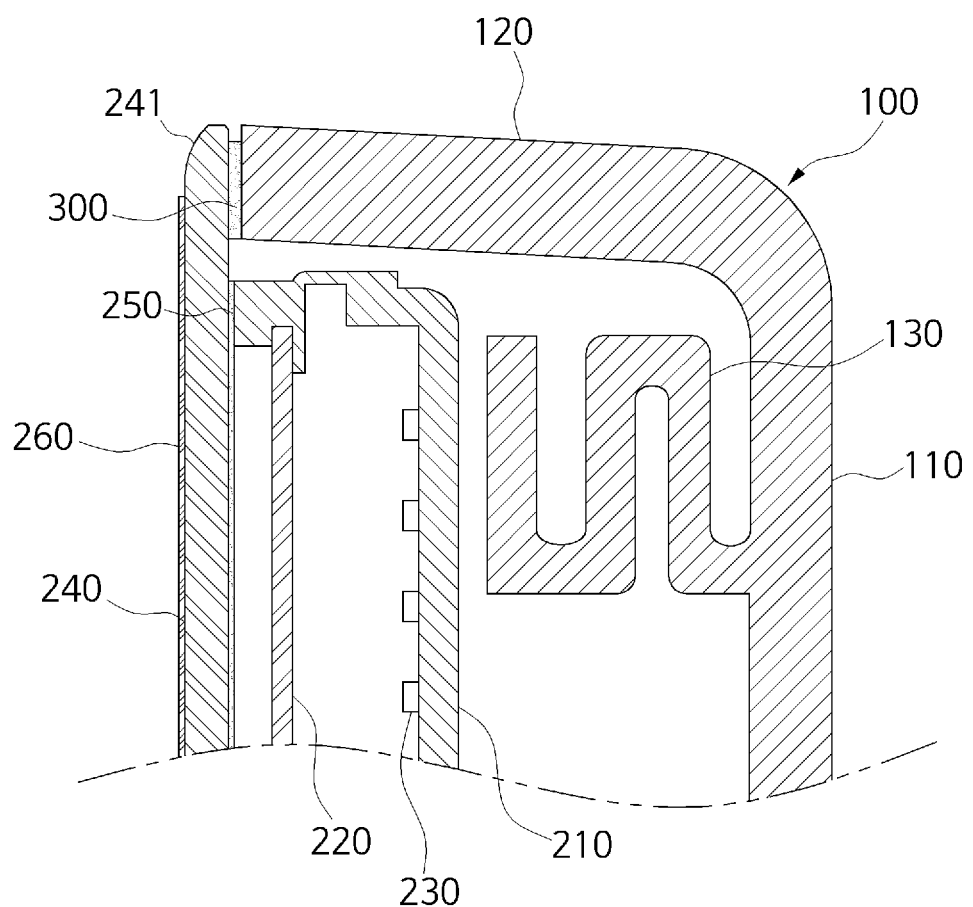
FIG. 4 is a cross-sectional view illustrating a display assembly for a vehicle in accordance with still another embodiment of the present disclosure.

FIG. 1 is an exploded perspective view illustrating a display assembly for a vehicle in accordance with an embodiment of the present disclosure, FIG. 2 is a cross-sectional view illustrating the display assembly for a vehicle in accordance with the embodiment of the present disclosure, FIG. 3 is a cross-sectional view illustrating a display assembly for a vehicle in accordance with another embodiment of the present disclosure, and FIG. 4 is a cross-sectional view illustrating a display assembly for a vehicle in accordance with still another embodiment of the present disclosure.

Referring to FIGS. 1 to 4, the display assembly for a vehicle in accordance with the embodiment of the present disclosure includes a back cover 100, an LCD module 200, and a coupling member 300.

The back cover 100 constitutes the body of the display assembly for a vehicle in accordance with the embodiment of the present disclosure, and is fixed to an instrument panel of the vehicle.

The front side of the back cover 100, facing the interior of the vehicle, is coupled to the LCD module 200 which outputs contents according to a driver or passenger's selection.

Such a back cover 100 includes a body part 110 and an extension part 120.

The body part 110 constitutes the body of the back cover 100 or the display assembly, has a plate shape, and is spaced apart by a predetermined distance from the LCD module 200 to the opposite side of the front side, i.e. the rear side.

The extension part 120 is formed along the edge of the body part 110 and extended toward the LCD module 200.

Therefore, the extension part 120 is formed along the edge of the body part 110, and thus seals the top, bottom, left, and right surfaces of the back cover 100.

That is, the front side of the back cover 100, facing the interior of the vehicle, communicates with the outside, and the rear side of the back cover 100, facing the opposite side of the interior of the vehicle, is sealed.

Through the front side of the back cover 100, various electronic parts for controlling the display assembly are housed in the back cover 100.

Referring to FIG. 3, the back cover 100 in accordance with another embodiment of the present disclosure may further include a tension member 130.

The tension member 130 is formed on a surface of the body part 110, facing the LCD module 200, and located at a position spaced apart by a predetermined distance from the extension part 120.

When seen from the side, the tension member 130 is formed in a stair shape, and extended toward the LCD module 200.

When the LCD module 200 is pushed toward the body part 110 by an external force, the tension member 130 supports the LCD module 200.

Therefore, the tension member 130 may effectively prevent the LCD module from being excessively pushed toward the body part 110.

When the LCD module 200 is coupled to the back cover 100, the tension member 130 is spaced apart by a predetermined distance from the LCD module 200.

That is, the tension member 130 may push the LCD module 200 toward the interior of the vehicle due to assembly dimensional tolerance during a process of assembling the LCD module 200 to the back cover 100, thereby effectively preventing the LCD module 200 from being separated from the back cover 100.

The LCD module 200 is disposed at the front of the back cover 100, and serves to output contents corresponding to a driver or passenger's manipulation.

Such an LCD module 200 includes a cover member 210, a display unit 220, a back light unit 230, a cover glass 240, and a bonding member 250.

The cover member 210 is housed in the back cover 100, such that the outer edge surface thereof is spaced apart by a predetermined distance from the inner edge surface of the back cover 100.

Furthermore, the cover member 210 is housed in the back cover 100, such that the rear surface thereof faces the rear surface of the back cover 100.

That is, the cover member 210 is housed in the back cover 100, such that the rear surface of the cover member 210 and the bottom surface of the back cover 100 face each other.

The display unit 220 is housed in the back cover 100, and serves to receive an output signal from the outside and display or output an image containing various pieces of information.

That is, the display unit 220 is an output unit to display information related to the display assembly such that a driver can visually and easily recognize necessary information.

The back light unit 230 is housed in the cover member 210, and disposed at the rear of the display unit 220 so as to be mounted on the bottom surface of the cover member 210.

The back light unit 230 is a lighting control device that transfers light to the display unit 220 while constantly controlling the amount of transmitted light.

The cover glass 240 is disposed on the front side of the cover member 210, facing the interior of the vehicle.

Such a cover glass 240 serves to protect the display unit 220 and the back light unit 230, housed in the cover member 210, from an external force.

The back cover 100 has an edge length equal to or smaller than the cover glass 240.

That is, when a driver or passenger sees the display assembly for a vehicle in accordance with the embodiment of the present disclosure from the front side, the edge region of the back cover 100 does not protrude from the edge of the cover glass 240, but is covered by the cover glass 240.

Thus, the edge region of the LCD module 200 may be removed so that the LCD module 200 has a bezel-less shape, which makes it possible to improve the interior quality of the instrument panel on which the display assembly for a vehicle is mounted.

The cover glass 240 has a round portion 241 formed along the edge thereof on the interior side of the vehicle, the round portion 241 having a curvature radius of about 2.5 mm. In other words, the edge of the cover glass 240 may be rounded to have the curvature radius of about 2.5 mm Thus, the cover glass 240 may satisfy the rules related to head impact interior fitting.

The round portion 241 formed along the edge of the cover glass 240 may be formed through an NC (Numerical Control) process.

Therefore, the round portion 241 may be formed more precisely through the CN process.

The bonding member 250 is disposed between the cover member 210 and the cover glass 240, such that the cover member 210 and the cover glass 240 are bonded to each other.

The bonding member 250 has an area smaller than or equal to the area of the display unit 220.

Such a bonding member 250 may include or be formed of an optically clear adhesive (OCA).

The OCA is formed in a film shape such as a double-sided tape.

The OCA transmits light by about 97% or more, and thus functions like glass.

Therefore, the OCA may not only reliably bond the cover glass 240 to the cover member 210, but also clearly output information outputted from the display unit 220.

In the present embodiment, it has been described that the bonding member 250 includes or is formed of an OCA having a film shape such as a double-sided tape. However, the bonding member 250 may include or be formed of liquid optically clear resin (OCR) as long as the bonding member 250 can bond the cover glass 240 to the cover member 210 and transmit light.

Referring to FIG. 4, the LCD module 200 in accordance with still another embodiment of the present disclosure may further include a film member 260.

The film member 260 is attached to the surface of the cover glass 240, facing the interior of the vehicle.

Such a film member 260 may include or be formed of an anti-shatter film (ASF).

The ASF serves to prevent glass fragments from shattering when the cover glass is broken.

That is, although the cover glass 240 is broken by an external force applied to the display assembly for a vehicle, the film member 260 may prevent glass fragments from shattering, which makes it possible to effectively protect a driver and passenger in the vehicle.

In particular, the ASF may be formed by applying a printing technology which is difficult to express on general toughened glass, and thus can produce various decoration effects while maintaining the unique gloss and texture and high surface hardness of the tightened glass, which makes it possible to improve the interior quality of the display assembly for a vehicle.

The coupling member 300 is disposed between the back cover 100 and the LCD module 200, and serves to couple the back cover 100 and the LCD module 200.

Specifically, the coupling member 300 is disposed between the extension part 120 constituting the back cover 100 and the cover glass 240 constituting the LCD module 200, and serves to couple the back cover 100 and the cover glass 240 to each other.

The coupling member 300 is formed in a belt shape along the extension part 120.

Such a coupling member 300 is formed in a film shape such as a double-sided tape, like the bonding member 250.

However, since the coupling member 300 is not a component that needs to transmit light unlike the bonding member 250, the coupling member 300 may be made of an opaque adhesive which can simply couple the back cover 100 and the LCD module 200.

In the above-described display assembly for a vehicle in accordance with the embodiment of the present disclosure, the edge region of the back cover 100 may not protrude from the edge of the cover glass 240, but may be covered by the cover glass 240. Therefore, the edge region of the LCD module 200 may be removed so that the LCD module 200 has a bezel-less shape, which makes it possible to improve the interior quality of the instrument panel on which the display assembly for a vehicle is mounted.

Furthermore, the round portion 241 having a curvature radius of about 2.5 mm may be formed along the edge of the cover glass 240 on the interior side of the vehicle, and thus the cover glass 240 can satisfy the rules related to the head impact interior fitting.

Furthermore, the tension member 130 may be extended in a stair shape toward the LCD module 200, thereby effectively preventing the LCD module 200 from being excessively pushed toward the body part 110.

Furthermore, when the LCD module 200 is coupled to the back cover 100, the tension member 130 may be spaced apart by a predetermined distance from the LCD module 200. Thus, the tension member 130 may prevent the LCD module 200 from being separated from the back cover 100 by a force of pushing the LCD module 200 toward the interior of the vehicle.

While various embodiments have been described above, it will be understood to those skilled in the art that the embodiments described are by way of example only. Accordingly, the disclosure described herein should not be limited based on the described embodiments.

What is claimed is:

1. A display assembly for a vehicle, comprising:
    an LCD module comprising (1) a cover glass having a rounded outer edge, and (2) a display unit disposed behind and overlapped by the cover glass in a first direction and configured to display an image;
    a back cover disposed behind the LCD module, the back cover comprising (1) a body part coupled to an instrument panel of the vehicle, and (2) an extension part extending from an outer edge of the body part toward the rounded outer edge of the LCD module without overlapping the display unit in the first direction; and
    a coupling member comprising a double-sided tape disposed between and in contact with the rounded outer edge of the cover glass and the extension part of the back cover, the double-sided tape having a belt shape and extending along the rounded outer edge of the cover glass without overlapping the display unit in the first direction.

2. The display assembly of claim 1, wherein the LCD module comprises:
    a cover member housed in the back cover and having an outer edge surface spaced apart from an inner edge surface of the back cover, the cover glass disposed on the cover member; and
    a bonding member disposed between the cover member and the cover glass and configured to bond together the cover member and the cover glass, and
    wherein the display unit is housed in the cover member.

3. The display assembly of claim 1, wherein the rounded outer edge of the cover glass has a curvature radius of about 2.5 mm.

4. The display assembly of claim 2, wherein the bonding member has an area smaller than or equal to that of the display unit.

5. The display assembly of claim 2, wherein the bonding member comprises an optically clear adhesive (OCA).

6. The display assembly of claim 2, wherein an edge of the back cover has a length smaller than or equal to that of the cover glass.

* * * * *